(No Model.)

E. G. SHORTT.
WATER TUBE FOR STEAM BOILERS.

No. 447,209. Patented Feb. 24, 1891.

Witnesses,
Robt. Everitt,
J. A. Rutherford.

Inventor,
Edward G. Shortt,
By James L. Norris,
Atty.

UNITED STATES PATENT OFFICE.

EDWARD G. SHORTT, OF CARTHAGE, ASSIGNOR OF ONE-HALF TO CHARLES G. EMERY, OF BROOKLYN, NEW YORK.

WATER-TUBE FOR STEAM-BOILERS.

SPECIFICATION forming part of Letters Patent No. 447,209, dated February 24, 1891.

Application filed June 19, 1890. Serial No. 355,967. (No model.)

*To all whom it may concern:*

Be it known that I, EDWARD G. SHORTT, a citizen of the United States, residing at Carthage, in the county of Jefferson and State of New York, have invented new and useful Improvements in Water-Tubes for Steam-Boilers, of which the following is a specification.

My present invention relates to water-tubes for steam-boilers; and the purpose thereof is to provide a novel construction whereby a large increase of heating-surface is obtained.

It is my purpose, also, to provide a novel construction whereby the bubbles or globules of steam as they are generated in a horizontal tube are trapped and prevented from returning into that part of the tube where they were generated by the inflowing current of water.

It is my further purpose to provide a construction whereby the water flowing into the tube shall receive a constant agitation, whereby new water-surfaces are continually brought into direct contact with the heating-surface, thus obtaining a more rapid generation of steam.

My invention consists to these ends in the novel features of construction, and in the new and useful device hereinafter fully set forth, and then definitely pointed out in the claims following this specification.

Figure 1:
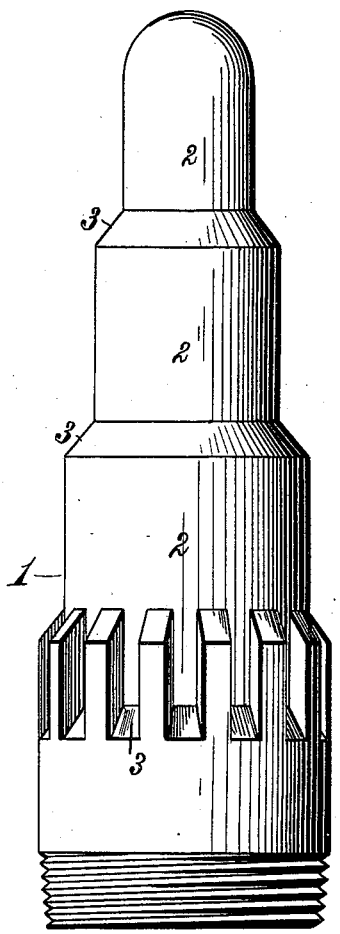
Figure 2:
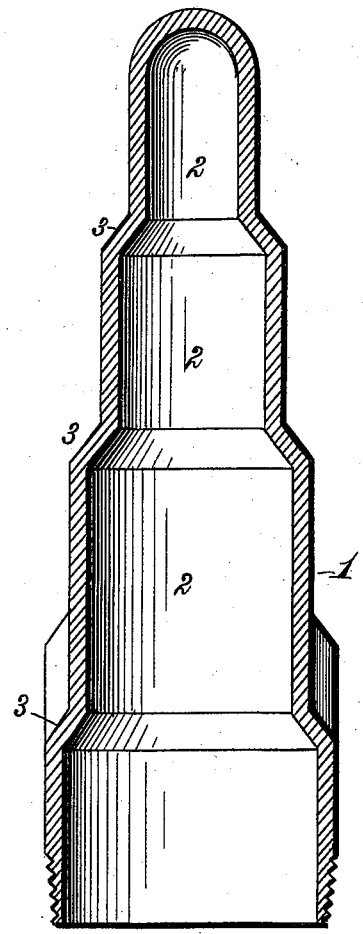

Referring to the drawings accompanying this specification, Figure 1 is a side elevation of a water-tube constructed in accordance with my invention. Fig. 2 is a central or axial section of the same.

In the said drawings, the reference-numeral 1 denotes a water-tube of suitable length and composed of a series of constantly-diminishing sections 2, the section of greatest diameter being that which is attached to the boiler. Between each of the sections 2 is an intermediate section 3, which is inclined at an angle to the axis of the tube of about forty-five degrees, as shown in Fig. 2; but this angle may be varied in either direction to any degree required.

I have shown the tube as composed of four sections of successively-decreasing diameter toward the closed end; but the number of said sections may be varied, if desired. Upon the larger section is formed the male thread; but the ratchet is upon the succeeding section to render the application of the spanner-wrench easier.

It will be seen that as compared with a tube having a constant and smooth or true taper this tube will present at least ten per cent. more heating-surface with the same length. When placed horizontally, the upper portions of the intermediate sections 3 trap the globules or bubbles of steam as they are formed and prevent them from being carried back into that portion of the tube where they are generated; otherwise this result would be caused by the inflowing current of water. Moreover, the water flowing inwardly is agitated by the inclined walls of the intermediate sections as it flows over the bottom of the tube, thereby presenting constantly new water-surfaces to the heating-surface of the tube, and thereby accelerating the heating of the water and the generation of steam.

What I claim is—

1. A water-tube for steam-boilers, consisting of a series of integral sections of successively-decreasing diameter toward the closed end of the tube, substantially as described.

2. A water-tube for steam-boilers, consisting of a series of sections of successively-diminishing diameter toward the closed end of the tube, said sections being united by integral intermediate sections, substantially as described.

3. A water-tube for steam-boilers, consisting of a series of sections of constantly-diminishing diameter toward the closed end of the tube, said sections being united by intermediate sections having their walls inclined at an angle to the axis of the tube, substantially as described.

4. A water-tube for steam-boilers, consisting of a series of sections increasing in diameter successively from the closed end toward the open end, the final or larger section being provided with a screw-thread and the next in succession with an annular ratchet, substantially as described.

In testimony whereof I have affixed my signature in presence of two witnesses.

EDWARD G. SHORTT.

Witnesses:
A. G. PECK,
W. N. WRAPE.